P. MENZIES & A. F. & S. A. CULLON.
TRANSMISSION MECHANISM.
APPLICATION FILED NOV. 30, 1909.

981,298.

Patented Jan. 10, 1911.

UNITED STATES PATENT OFFICE.

PERCY MENZIES, ALEXANDER FREDERICK CULLON, AND SAMUEL ALBERT CULLON, OF DETROIT, MICHIGAN, ASSIGNORS OF ONE-FOURTH TO ROBERT CAMPBELL, OF DETROIT, MICHIGAN.

TRANSMISSION MECHANISM.

981,298.  Specification of Letters Patent.  Patented Jan. 10, 1911.

Application filed November 30, 1909. Serial No. 530,631.

*To all whom it may concern:*

Be it known that we, PERCY MENZIES, ALEXANDER FREDERICK CULLON, and SAMUEL ALBERT CULLON, subjects of the King of Great Britain, residing at Detroit, in the county of Wayne and State of Michigan, have invented certain new and useful Improvements in Transmission Mechanism, of which the following is a specification, reference being had therein to the accompanying drawings.

This invention relates to transmission mechanism for driving a follower shaft from a main shaft to rotate either in the same or reverse direction at equal or less speed.

The invention consists in the matters hereinafter set forth, and more particularly pointed out in the appended claims.

Figure 1:
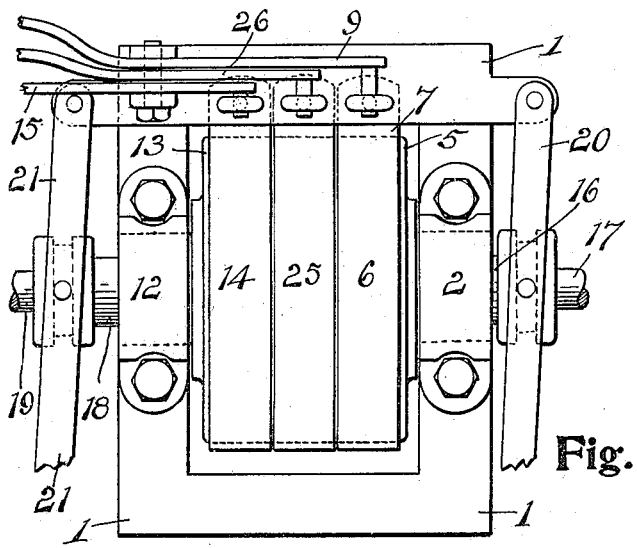
Figure 2:
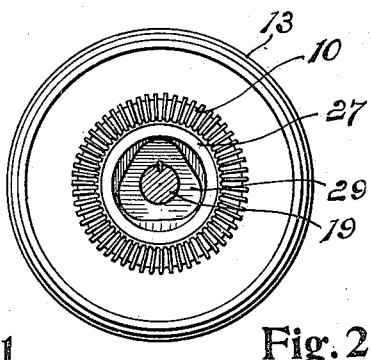
Figure 3:
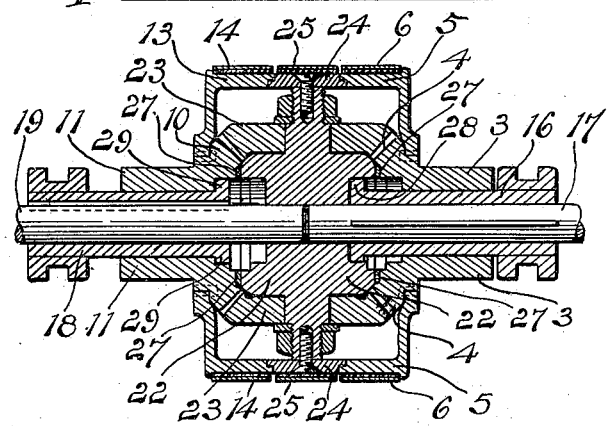
Figure 4:
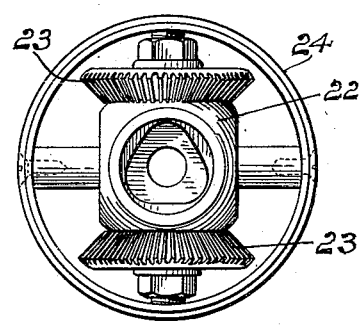

Referring to the drawings, Figure 1 is a plan view of mechanism embodying features of the invention, showing the parts in reverse, slow speed position; Fig. 2 is a view in end elevation of a follower shaft, a gear and drum, and a clutch slide member; Fig. 3 is a view in longitudinal section with the parts in reverse slow speed position, the outer bearing frame being omitted; and Fig. 4 is a view in elevation of a clutch spider and intermediate pinions thereon.

In the drawings, a suitable frame 1 has a thrust bearing 2 in which the hub 3 of a bevel gear 4 is journaled. A brake drum 5 is secured concentrically on the gear, and a strap or band 6 around the drum has one end 7 secured to the frame 1 and the other extremity secured to a lever 9 by which it may be tightened to lock the drum from turning, or other suitable controlling means may be used.

A follower bevel gear 10 has a hub 11 journaled in a thrust bearing 12 on the frame 1 in axial alinement with the hub 3, and a corresponding drum 13 with brake band 14 operated by a lever 15, or other preferable means.

A clutch sleeve 16 is rotatable and reciprocable in the hub 3, and has non-rotatable, sliding engagement with a main shaft 17. A follower clutch sleeve 18 is likewise journaled in the follower gear hub 11 to reciprocate longitudinally therein on a follower shaft 19 to which it is keyed or otherwise non-rotatably secured. The outer ends of the clutch sleeves are grooved or otherwise adapted for operative connections with shift levers 20 and 21 by which they may be manipulated.

A clutch spider 22 is journaled on the abutting ends of the main and follower shafts and carries one or more intermediate pinions 23 in constant mesh with the gears 4 and 10. A friction drum 24 is concentrically secured on the spider to rotate between the gear drums 5 and 13, and is provided with a friction strap 25 operated by a lever 26. The proximate margins of the drums are adapted to form bearings for overcoming end-play, and suitable friction washers 27 are likewise inserted between the spider and adjacent end faces of the gears.

An angular head 28 integrally formed or secured on the inner end of the clutch sleeve 16 is adapted to enter a mating socket in the spider 22 or a corresponding recess in the end face of the gear 4, to lock either to turn with the drive shaft. A similar head 29 on the follower clutch sleeve 18 is likewise adapted to interlock with the spider 22 or follower gear 11.

In operation, if both clutch sleeves are thrown into engagement with the spider, the shafts rotate in unison. If the parts are placed as indicated in Fig. 3, with the sleeve 16 interlocked with the spider 22, and the drum 5 held by its band, the follower shaft is driven in forward direction. If the gears and pinions be of equal size, as herein indicated, the follower shaft has one half the speed of the main shaft. When the sleeve 16 is locked to turn with the drum 5, and the sleeve 18 with the spider 22, and the drum 13 is held from turning, the follower shaft rotates reversely to the direction of the main shaft at one half the main shaft speed. The band 25, when applied to the spider drum 24, acts as a brake.

Obviously, changes in details of construction may be made without departing from the spirit of the invention, and we do not limit ourselves to any particular form or arrangement of parts.

What we claim as our invention is:—

1. In a transmission mechanism, a frame having a pair of alined end thrust bearings, oppositely disposed bevel gears journaled in and between the bearings, longitudinally reciprocable sleeves each journaled in a gear and adapted to non-rotatably interlock therewith when at the outer limit of movement, shafts non-rotatable in the sleeves, a spider rotatable on the shafts between the gears which prevent its endwise displacement, adapted to interlock with the sleeves when they are disengaged from the gears, pinions on the spider in mesh with both gears, means for severally locking the gears and spider from rotating, and means for shifting each sleeve.

2. In a transmission mechanism, a frame having a pair of alined end thrust bearings, oppositely disposed bevel gears journaled in and between the bearings, longitudinal reciprocable sleeves each journaled in a gear and adapted to non-rotatably interlock therewith when at the outer limit of movement, shafts non-rotatable in the sleeves, a spider rotatable on the shafts between the gears which prevent its endwise displacement, adapted to interlock with the sleeves when they are disengaged from the gears, pinions on the spider in mesh with both gears, a brake drum concentrically secured on each gear, a brake drum concentrically secured on the spider, friction bands encircling each drum, means on the frame for moving each band into frictional engagement with its drum, and means for shifting each sleeve.

3. In a transmission mechanism, a frame having a pair of alined end thrust bearings, oppositely disposed bevel gears journaled in and between the bearings, longitudinally reciprocable sleeves each journaled in a gear, an angular head on the inner end of each sleeve adapted to enter a mating recess in the companion gear when the sleeve is at its outer limit of motion, shafts each non-rotatable in a sleeve, a spider rotatable on the adjacent ends of the shaft having a recess in each end face mating with the proximate sleeve head which enters it when moved out of the gear recess, pinions on the spider meshing with both gears, means for severally locking the gears and spider from rotating and means for shifting each sleeve.

4. In a transmission mechanism, a frame having a pair of alined end thrust bearings, oppositely disposed bevel gears journaled in and between the bearings, longitudinally reciprocable sleeves each journaled in a gear, an angular head on the inner end of each sleeve adapted to enter a mating recess in the companion gear when the sleeve is at its outer limit of motion, shafts each non-rotatable in a sleeve, a spider rotatable on the adjacent ends of the shaft having a recess in each end face mating with the proximate sleeve head which enters it when moved out of the gear recess, pinions on the spider meshing with both gears, a brake drum concentrically secured on each gear, a brake drum concentrically secured on the spider, friction bands encircling each drum, means on the frame for moving each band into frictional engagement with its drum, and means for shifting each sleeve.

In testimony whereof we affix our signatures in presence of two witnesses.

PERCY MENZIES.
 ALEXANDER FREDERICK CULLON.
 SAMUEL ALBERT CULLON.

Witnesses:
 ANNA M. DORR,
 GENEVIEVE E. MCGRANN.